(12) United States Patent
Summers et al.

(10) Patent No.: US 6,215,624 B1
(45) Date of Patent: Apr. 10, 2001

(54) DISK DRIVE SUSPENSION MOUNTING PLATE WITH TORQUE ENHANCING FEATURE

(75) Inventors: Robert Summers; Warren Coon, both of Temecula, CA (US)

(73) Assignee: Magnecomp Corp., Temecula, CA (US)

( * ) Notice: Subject to any disclaimer, the term of this patent is extended or adjusted under 35 U.S.C. 154(b) by 0 days.

(21) Appl. No.: 09/362,644

(22) Filed: Jul. 27, 1999

Related U.S. Application Data

(60) Provisional application No. 60/143,064, filed on Jul. 8, 1999.

(51) Int. Cl.[7] ....................................................... G11B 5/48
(52) U.S. Cl. ............................................................. 360/244.5
(58) Field of Search ................................ 360/244.5, 265.9

(56) References Cited

U.S. PATENT DOCUMENTS

| | | | |
|---|---|---|---|
| 5,187,626 | * | 2/1993 | Hopkins et al. ................ 360/104 |
| 5,602,698 | * | 2/1997 | Miyazaki et al. .............. 360/104 |
| 5,717,545 | * | 2/1998 | Brooks, Jr. et al. ............ 360/104 |
| 5,759,418 | * | 6/1998 | Frater et al. ...................... 216/22 |
| 5,808,835 | * | 9/1998 | Fujiwara ........................ 360/104 |
| 5,812,343 | * | 9/1998 | Budde et al. .................. 360/104 |
| 5,828,521 | * | 10/1998 | Hasegawa ...................... 360/104 |
| 6,128,164 | * | 10/2000 | Kant et al. ................... 360/244.5 |

* cited by examiner

*Primary Examiner*—Jefferson Evans
(74) *Attorney, Agent, or Firm*—Louis J. Bachand

(57) ABSTRACT

A disk drive suspension has improved fixing of the load beam to the actuator arm by positively interlocking the actuator arm and the mount plate carrying the load beam with cooperating locking structure on the plate and arm.

17 Claims, 4 Drawing Sheets

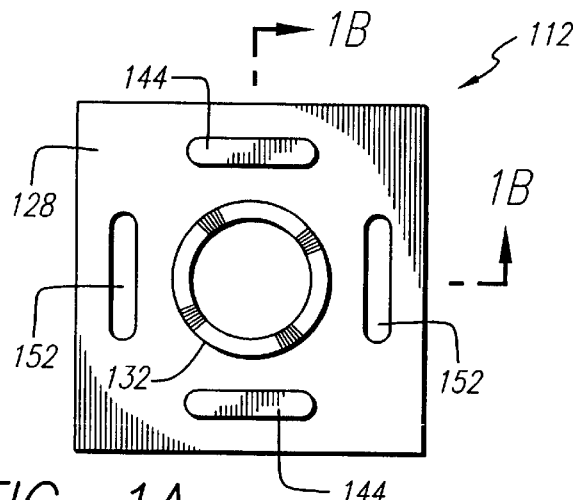
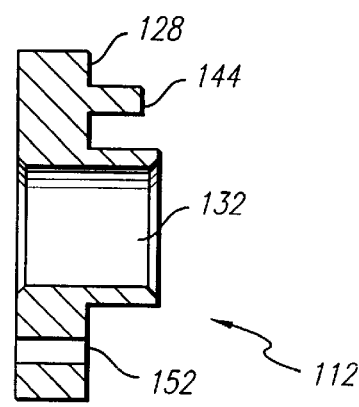
FIG. 1A     FIG. 1B
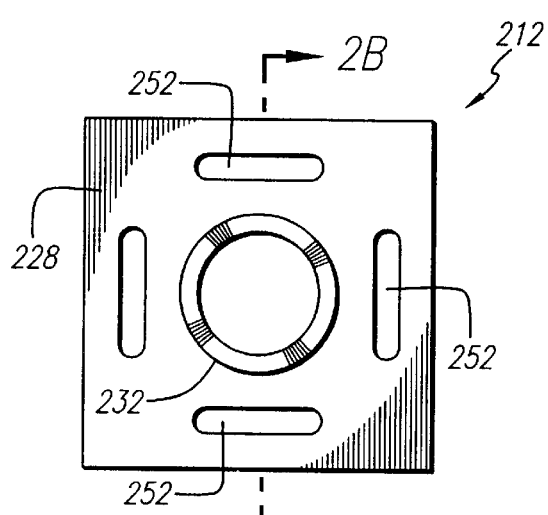
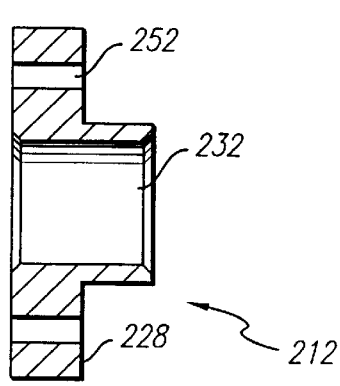
FIG. 2A     FIG. 2B
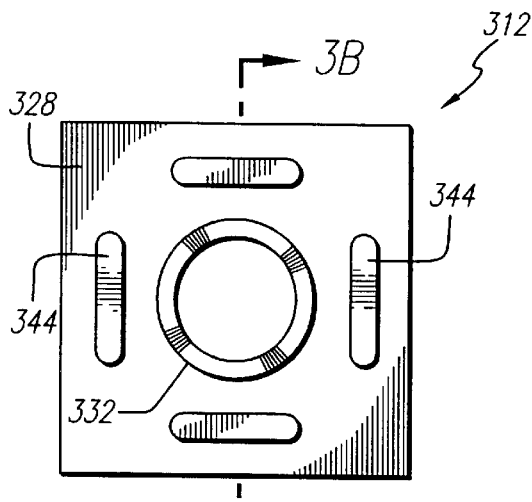
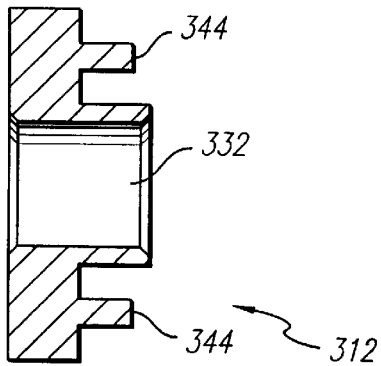
FIG. 3A     FIG. 3B

DISK DRIVE SUSPENSION MOUNTING PLATE WITH TORQUE ENHANCING FEATURE

REFERENCE TO RELATED APPLICATION

This application claims the benefit of United States Provisional Application Ser. No. 60/143,064, filed Jul. 8, 1999.

BACKGROUND OF THE INVENTION

1. Field of the Invention

This invention relates to disk drive suspensions, and more particularly to improvements in the mounting plates used to secure load beams to actuator arms. In the invention, positive coupling is obtained between the mounting plate and the actuator arms by defining cooperating locking structure on the respective components. The mounting plate thus does not rely merely on radial forces between the mounting plate boss and the actuator arm bore opening to engage the mounting plate and arm, as is conventional, but uses added structure to better ensure that there is no slippage between the arm and the load beam.

2. Related Art

Disk drive suspensions typically comprise a load beam carried on an actuator arm by virtue of the load beam base portion being welded to a mounting plate that is swaged into engagement with a bore in the actuator arm, e.g. as shown in U.S. Pat. No. 4,829,395. The mounting plate had a central, annular boss and a planar base surrounding the boss. The boss was swaged into the bore of the actuator arm for securing the load beam, attached to the mounting plate, to the arm. Originally, the mounting plates comprised machine-turned structures that of necessity were axially symmetric. Later, stamped versions were made that were identical in form, or nearly so, to the machine turned originals. Still later, designers took advantage of the stamping process to make extended mounting plate designs that were not axially symmetric.

Through all of this evolutionary change, the mounting plate design in use was an attempt to compromise staking integrity (torque-out), needed for secure connection of the load beam to the actuator arm, with gram load change, i.e. the change in the gram load imposed by the load beam in response to the staking operation. These two parameters were usually traded off against each other, so that improving one had a resulting degradation of the other, because of the nature of the staking operation.

The staking of the mounting plate to the actuator arm bore has been accomplished by swaging. In swaging, a series of steel balls of increasing diameter and all larger than the boss ID are pushed through the mounting plate annular boss to force the boss OD outward and into engagement with the surrounding bore of the actuator arm. This engagement provides a swaged joint. The tolerances of the stamped mounting plate and the actuator arm usually provide marginal retention (torque) values, i.e. resistance to slippage between the mounting plate boss and the arm bore.

The accepted method of determining swaged retention values is to test for rotational torque. A torque meter is attached to the stamped swage mount and rotated until the mount is displaced. Normally this test is done as an in process control operation. By adjusting the ball size, for a given combination of mount plate design and actuator dimensions, torque retention can be improved at the expense of gram load change. To assure torque values that are acceptable (10 in-oz or above) over a wide range of actuators sizes that may vary from the nominal design value due to manufacturing tolerance, a conservative approach would be to use a larger ball size than is absolutely necessary. This assures the worst case torque is sufficiently high. But, in this case the gram load change will be higher that desirable.

And, as drive size is reduced and the actuator becomes thinner and thus has a shorter boss height, the area of engagement is reduced and the retention torque becomes even less because the retention torque is proportional to the engagement length (defined as the amount of overlapping distance between the actuator and the boss of the mounting plate.

SUMMARY OF THE INVENTION

There is a need for higher torque retention values without increasing concomitant gram load change than is available with the current generation of mounting plate designs.

It is an object, therefore, to provide in a disk drive suspension higher torque values without undesirable increases in gram load changes. It is a further object to obtain such balance between torque improvement and gram load change at no increase in manufacturing cost, and in a manner consistent with present manufacturing techniques.

These and other objects of the invention are realized with a novel mounting plate having one or more normally disposed tabs that will interlock with cooperating structure on the actuator arm. These tabs provide an estimated 4 to 5 times increase in the torque values now provided by non-positive engagements typical of the past art. The tabs are to be a very close fit to the cooperating structure such as slots. Known stamping processes can be used as these routinely form features sized to within 0.0005 inches or less. If the tabs and slots happened to slightly interfere, the clamping force that holds the stack in vertical compression during staking would force a press fit. This clamping force is typically 100 to 140 lbs, which is equivalent to 2500 to 3500 PSI when applied to the 0.200 inch by 0.200 inch (0.040 square inch) mounting plate area.

The invention enhanced mounting plate system can be provided with either torque enhancing tabs on the mounting plate base, to interfit with slots on the actuator arm, or the torque enhancing tabs can be developed on the actuator arm to interfit with slots formed in the mounting plate base. No particular number, shape or size of cooperating locking structure tab and slot structures is required provided the objects of the invention are realized, and their pattern can be symmetrical or nonsymmetrical. Preferably, but not necessarily, the parts are formed by stamping techniques where the cost to form additional features in the part will be minimal with no increase in per part charges after a minor increase in tooling costs. Other forming techniques can be used.

A further advantage of the invention is that enhanced mounting plate/actuator arm system can be used within the standard assembly process now used by most Head Stack Assembly (HSA) manufacturers, by interfitting the parts following the juxtaposition of the loose pieces of the HSA onto the staking fixture, and before staking. The process steps to build the headstack assembly are otherwise unchanged. At the earlier Head Gimbal Assembly (HGA) level, minor tooling changes may required to handle the protruding tabs at the fixtures for slider bonding, gram load check, and electrical and flying height testing.

The foregoing objects and advantages of the invention are realized in a disk drive suspension for mounting to an actuator arm having a through opening and an actuator opening edge margin face theresurrounding, the suspension being adapted to cantilever-support from the actuator arm a slider disposed in operating proximity to a disk, the suspension comprising a suspension assembly of a load beam having a base portion and a mounting plate having a central boss and a surrounding base to which said load beam base porion is fixed, said boss defining a mounting plate through opening, said mounting plate base defining an edge margin face surrounding the mounting plate through opening and in opposed relation to the actuator arm edge margin face, the actuator arm and the mounting plate opposed edge margin faces defining distributed pairs of cooperating interfitting members on their respective opening edge margin faces, the interfitting members being arranged to block relative rotation between the actuator arm and the load beam mounting plate.

In this and like embodiments, typically, the mounting plate defines first cooperating interfitting members comprising a distributed series of apertures, and the actuator arm defines second cooperating interfitting members comprising a distributed series of tabs complementary to and arranged in interfitting relation with the aperture series, the mounting plate apertures are circularly distributed about the mounting plate through opening, the tab series being circularly distributed about the actuator arm through opening, the mounting plate apertures comprise longitudinally extended slots, the actuator arm tabs being longitudinally extended, shaped and sized to closely interfit with the slots, the slots and tabs are preferably disposed 90 degrees apart about the through holes, and the slots include a first one, pair or triplet of slots located on the mounting plate and complementarily a triplet, pair or one of slots located on the actuator arm, the tabs being disposed opposite their cooperating slots. For example, the slots can include a first pair of slots located on the mounting plate and a second pair of slots located on the actuator arm, the tabs being disposed in pairs opposite the first and second slot pairs.

In a further embodiment, the invention provides a disk drive suspension in which the actuator arm defines first cooperating interfitting members comprising a distributed series of apertures, and the mounting plate defines second cooperating interfitting members comprising a distributed series of tabs complementary to and arranged in interfitting relation with the aperture series.

In this and like embodiments, typically, the mounting plate tabs are circularly distributed about the mounting plate through opening, the aperture series being circularly distributed about the actuator arm through opening, the actuator arm apertures comprise longitudinally extended slots, the mounting plate tabs being longitudinally extended, shaped and sized to closely interfit with the slots, and, preferably, the slots and tabs are disposed 90 degrees apart about the through holes.

In a further embodiment, typically, the invention provides a load beam mounting apparatus for mounting a load beam to an actuator arm, the mounting apparatus comprising a mounting plate having a base and a boss, the mounting plate base having locking structure defined thereon, the actuator arm defining complementary locking structure to the mounting plate base locking structure, the mounting plate base being adapted to be fixed to a load beam to secure the load beam to the actuator arm in locking structure locked relation.

In this and like embodiments, typically, the actuator arm defines at least one tab normal to the arm, the mounting plate base locking structure comprising at least one aperture arranged to closely receive the actuator arm tab to fix the load beam to the actuator arm, there is further included an actuator arm, and the actuator arm has an opening adapted to receive the mounting plate boss, the actuator arm defining a series of the tabs circularly distributed about the opening, the mounting plate locking structure comprising a series of apertures complementary to the tabs in receiving relation, the actuator arm series of tabs comprises four tabs arranged, preferably, at 90 degree intervals, the mounting plate locking structure apertures being like in number and spacing to the tabs in tab receiving relation, or, the actuator arm defines at least one aperture, the mounting plate base locking structure comprising at least one tab normal to the base and arranged to closely receive the actuator arm tab to fix the load beam to the actuator arm, there is further included an actuator arm, and the actuator arm has an opening adapted to receive the mounting plate boss, the actuator arm defining a series of the apertures circularly distributed about the opening, the mounting plate base locking structure comprising a series of the tabs complementary in number and spacing to the actuator arm apertures and adapted to be closely received thereby, the mounting plate base locking structure series of tabs comprises four tabs arranged, preferably at 90 degree intervals, the actuator arm apertures being like in number and spacing to the tabs in tab receiving relation.

In yet another embodiment the invention provides a disk drive suspension mounting plate for mounting a load beam to an actuator arm, the mounting plate being engageable with the actuator arm in load beam mounting relation and comprising a base with a central aperture and a generally cylindrical boss extending normal to the base and coaxial with the plate aperture; the mounting plate being adapted to mount a load beam infixed relation and to be swaged to the actuator arm by radial displacement of the boss to fix the load beam to the actuator arm, the actuator arm and the mounting plate base defining interfitting slot and tab cooperating structures radially outward of the boss, the structures blocking relative rotation of the flange portion and the actuator arm in the engaged condition of the mounting plate and the actuator arm.

BRIEF DESCRIPTION OF THE DRAWINGS

The invention will be further described in conjunction with the attached drawings in which:

FIG. 1A is a top plan view of one embodiment of the invention;

FIG. 1B is view taken on line 1B—1B in FIG. 1A;

FIG. 2A is a top plan view of a second embodiment of the invention;

FIG. 2B is view taken on line 2B—2B in FIG. 2A;

FIG. 3A is a top plan view of a third embodiment of the invention;

FIG. 3B is view taken on line 3B—3B in FIG. 3A;

DETAILED DESCRIPTION

Figure 4:
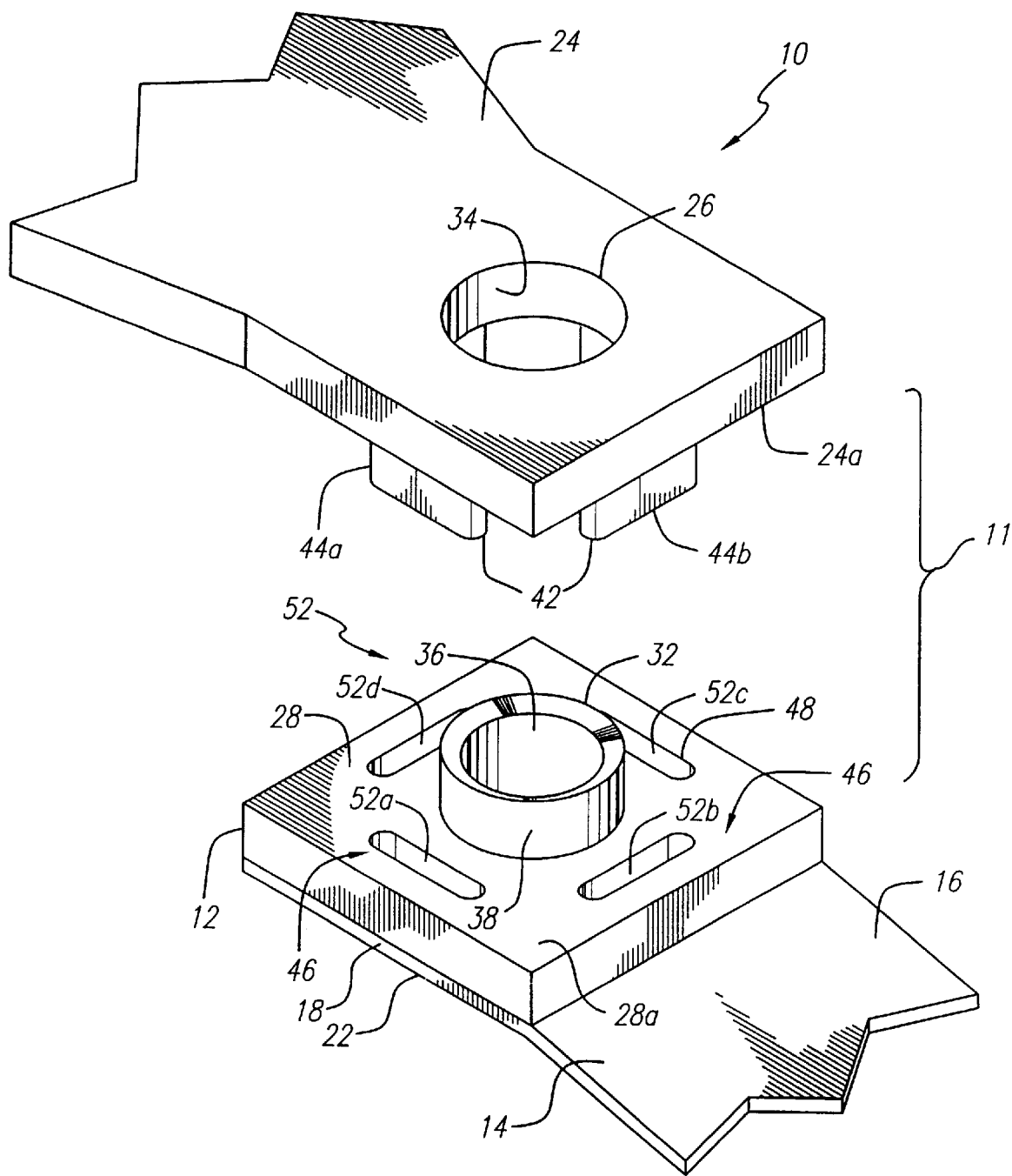
FIG. 4 is an exploded oblique view of a disk drive suspension according to the second embodiment of he invention.

With reference initially to FIG. 4, the invention disk drive suspension 10 comprises a mounting plate 12, a load beam 14 having a spring portion 16 and a base portion 18. Load beam base portion 18 is fixed relative to the mounting plate 12 by being welded to the mounting plate bottom surface 22. The load beam 14 is then attached to an actuator arm 24 that serves to shift the load beam and its carried slider (not shown) relative to a disk drive disk. Actuator arm 24 has an opening 26 for the purpose of mounting the load beam 14 and the mounting plate 12. Mounting plate 12 comprises a planar, generally rectangular base 28 and a central, annular boss 32 that fits into actuator arm opening 26 and is swaged into contact with the opening inner wall 34 by conventional forcing of an oversize ball or other swaging tool through the bore 36 in the boss 32.

To provide greater torque retention, the invention provides locking structure 11 affording positive engagement between the mounting plate 12 and the actuator arm 24 over and above the frictional forces at the interface of the boss outer wall 38 and the arm opening inner wall 34. For this purpose, in the FIG. 4 embodiment, a circularly distributed series 48 of rectangular slots 52 a–d extend normal to the mounting plate base edge margin face 28a and are centered on the boss 32. The load beam 14 is attached to the actuator arm 24 via the mounting plate 12 by interfittment of the upstanding tabs 44 a–d extending normal to the arm opening 26 edge margin face 24a, with the apertures 46 comprising a circularly distributed series 42 of tabs 44 a–d. Typically, the tabs 44 a–d and slots 52 a–d interfit as closely as possible optimally leaving only the mechanical clearances required for realizable tolerances.

With reference to FIGS. 1A, 1B, 2A, 2B and 3A and 3B, various forms of the mounting plate 12 are shown. In the FIGS. 1A, 1B embodiment, the mounting plate 112 comprises base 128 with circular boss 132. Base 128 is perforated with a pair of slots 152 and also has a pair of tabs 144 arranged symmetrically about the boss 132. In this embodiment, the mounting plate 112 is both male and female in character and will interfit with a complementarily slotted and tabbed actuator arm (not shown).

In FIGS. 2A and 2B, the mounting plate 212 comprises base 228 with circular boss 232. Base 228 defines four slots 252, spaced at 90 degrees from each other. In FIG. 4, a FIG. 2A type mounting plate (numbered 12) is shown juxtaposed with the load beam 14 and actuator arm 24, the tabs 44 (formed on actuator arm 24) being registered with slots 52.

Figure 5:
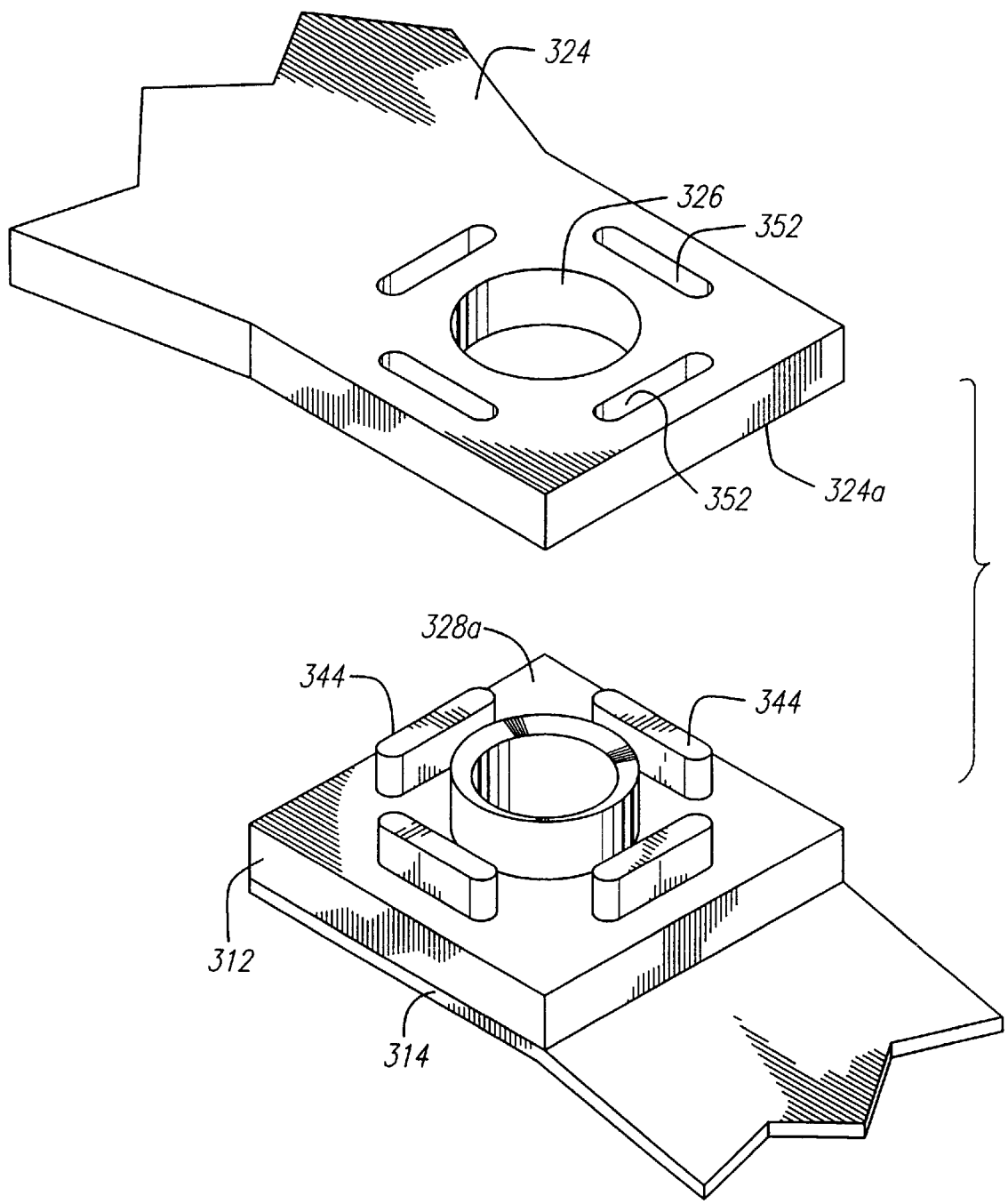
FIG. 5 is a view like FIG. 4 but of the third embodiment of the invention.
Figure 6:
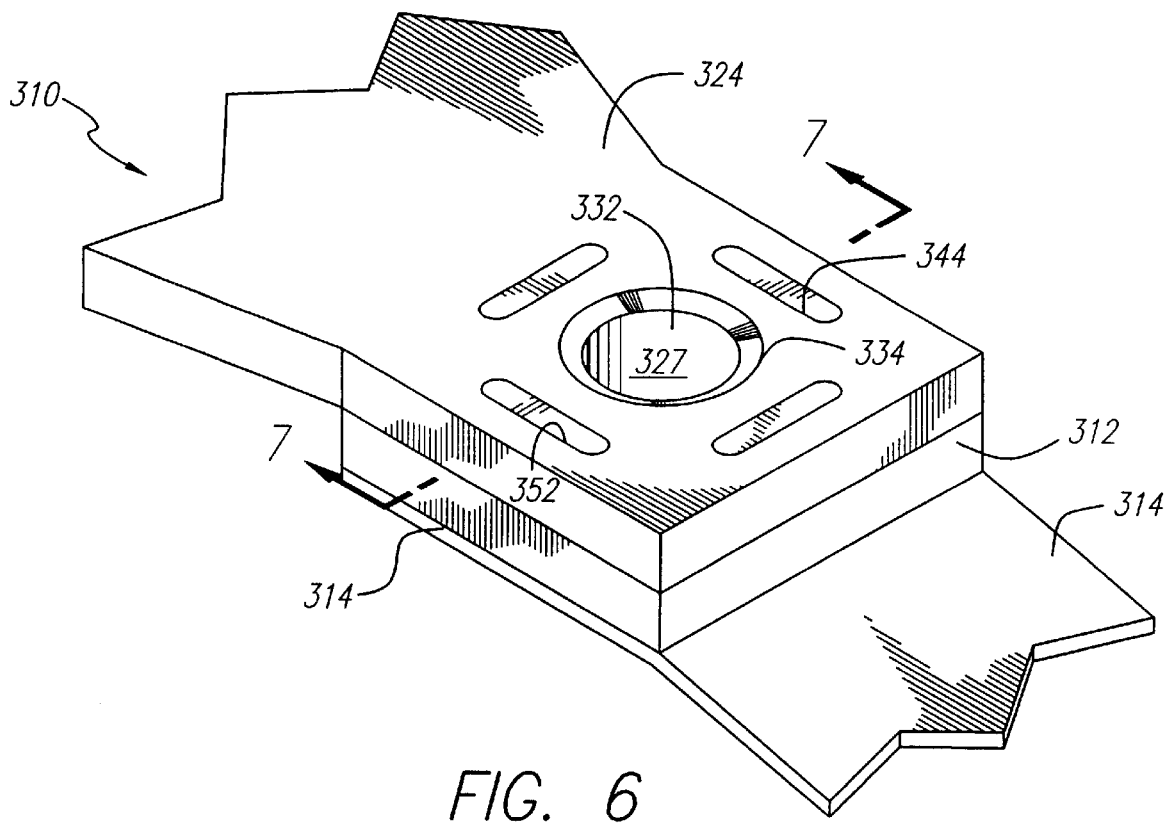
FIG. 6 is an oblique view of the third embodiment of the invention, shown assembled; and, FIG. 7 is a view taken on line 7—7 in FIG. 6.
Figure 7:
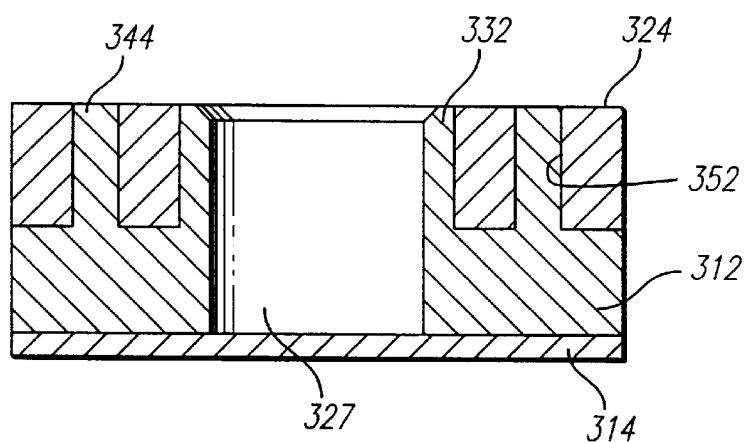

In FIGS. 3A and 3B, the mounting plate 312 comprises base 328 with circular boss 332. Base 328 defines four tabs 344, spaced 90 degrees from each other. In FIGS. 5–7, in which like parts to FIG. 4 have like numbers plus 300, a FIG. 3A type mounting plate 312 is shown juxtaposed and assembled with the load beam 314 and the actuator arm 324. The arm 324 defines slots 352 complementary to tabs 344 of the mounting plate 312 and arranged to lock the mounting plate and thus the load beam 314 against rotation relative to the arm.

Accordingly, the invention suspension 310 is adapted to cantilever-support from the actuator arm 324 a slider (not shown) disposed in operating proximity to a disk (not shown). The mounting plate base 328 defines an edge margin face 328a surrounding the mounting plate throughopening 327 defined by the boss 332 and in opposed relation to the actuator arm edge margin face 324a. The actuator arm 324 and the mounting plate 312 opposed edge margin faces 328a, 324a define distributed pairs of cooperating interfitting tab and aperture or slot members 344, 352 on their respective opening edge margin faces, the interfitting members being arranged to block relative rotation between the actuator arm 324 and the load beam 314 and mounting plate 312.

The forgoing objects of increased torque retention without increases in the staking parameters that cause gram load changes are thus realized.

We claim:

1. A disk drive suspension for mounting to an actuator arm having a through opening and an actuator opening edge margin face theresurrounding, said suspension being adapted to cantilever-support from said actuator arm a slider disposed in operating proximity to a disk, said suspension comprising a suspension assembly of a load beam having a base portion and a mounting plate having a central boss and a surrounding base to which said load beam base portion is fixed, said boss defining a mounting plate through opening, said mounting plate base defining an edge margin face surrounding said mounting plate through opening and in opposed relation to said actuator arm edge margin face, said actuator arm and said mounting plate opposed edge margin faces defining distributed pairs of cooperating interfitting members on their respective opening edge margin faces, said interfitting members being arranged to block relative rotation between said actuator arm and said load beam mounting plate.

2. The disk drive suspension according to claim 1, in which said mounting plate defines first cooperating interfitting members comprising a distributed series of apertures, and said actuator arm defines second cooperating interfitting members comprising a distributed series of tabs complementary to and arranged in interfitting relation with said aperture series.

3. The disk drive suspension according to claim 2, in which said mounting plate apertures are circularly distributed about said mounting plate through opening, said tab series being circularly distributed about said actuator arm through opening.

4. The disk drive suspension according to claim 3, in which said mounting plate apertures comprise longitudinally extended slots, said actuator arm tabs being longitudinally extended, shaped and sized to closely interfit with said slots.

5. The disk drive suspension according to claim 4, in which said slots and tabs are disposed 90 degrees apart about said through holes.

6. The disk drive suspension according to claim 5, in which said slots include a first pair of slots located on said mounting plate and a second pair of slots located on said actuator arm, said tabs being disposed in pairs opposite said first and second slot pairs.

7. The disk drive suspension according to claim 1, in which said actuator arm defines first cooperating interfitting members comprising a distributed series of apertures, and said mounting plate defines second cooperating interfitting members comprising a distributed series of tabs complementary to and arranged in interfitting relation with said aperture series.

8. The disk drive suspension according to claim 7, in which said mounting plate tabs are circularly distributed about said mounting plate through opening, said aperture series being circularly distributed about said actuator arm through opening.

9. The disk drive suspension according to claim 8, in which said actuator arm apertures comprise longitudinally extended slots, said mounting plate tabs being longitudinally extended, shaped and sized to closely interfit with said slots.

10. The disk drive suspension according to claim 9, in which said slots and tabs are disposed 90 degrees apart about said through holes.

11. A load beam mounting apparatus for mounting a load beam to an actuator arm, said mounting apparatus comprising a mounting plate having a base and a boss, said mounting plate base having locking structure defined thereon comprising at least one aperture, said actuator arm defining complementary locking structure to said mounting plate base locking structure comprising at least one tab normal to said arm, said aperture being arranged to closely receive said tab, said mounting plate base being adapted to be fixed to a load beam to secure said load beam to said actuator arm in locking structure locked relation.

12. The load beam mounting apparatus according to claim 11, further including an actuator arm, and in which said actuator arm has an opening adapted to receive said mounting plate boss, said actuator arm defining a series of said tabs circularly distributed about said opening, said mounting plate locking structure comprising a series of apertures complementary to said tabs in receiving relation.

13. The load beam mounting apparatus according to claim 12, in which said actuator arm series of tabs comprises four tabs arranged at 90 degree intervals, said mounting plate locking structure apertures being like in number and spacing to said tabs in tab receiving relation.

14. The load beam mounting apparatus according to claim 11, in which said actuator arm defines at least one aperture, said mounting plate base locking structure comprising at least one tab normal to said base and arranged to closely receive said actuator arm tab to fix said load beam to said actuator arm.

15. The load beam mounting apparatus according to claim 14, further including an actuator arm, and in which said actuator arm has an opening adapted to receive said mounting plate boss, said actuator arm defining a series of said apertures circularly distributed about said opening, said mounting plate base locking structure comprising a series of said tabs complementary in number and spacing to said actuator arm apertures and adapted to be closely received thereby.

16. The load beam mounting apparatus according to claim 15, in which said mounting plate base locking structure series of tabs comprises four tabs arranged at 90 degree intervals, said actuator arm apertures being like in number and spacing to said tabs in tab receiving relation.

17. A disk drive suspension mounting plate for mounting a load beam to an actuator arm, said mounting plate being engageable with said actuator arm in load beam mounting relation and comprising a base with a central aperture and a generally cylindrical boss extending normal to said base and coaxial with said plate aperture; said mounting plate being adapted to mount a load beam infixed relation and to be swaged to said actuator arm by radial displacement of said boss to fix said load beam to said actuator arm, said actuator arm and said mounting plate base defining interfitting slot and tab cooperating structures radially outward of said boss, said structures blocking relative rotation of said flange portion and said actuator arm in the engaged condition of said mounting plate and said actuator arm.

* * * * *